US010203786B1

(12) United States Patent
Hsu et al.

(10) Patent No.: US 10,203,786 B1
(45) Date of Patent: Feb. 12, 2019

(54) TOUCH ENABLED USER DEVICE WITH UNPOWERED DISPLAY

(71) Applicant: AMAZON TECHNOLOGIES, INC., Seattle, WA (US)

(72) Inventors: Morris Yuanhsiang Hsu, Sunnyvale, CA (US); Jagan Vaidyanathan Rajagopalan, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 182 days.

(21) Appl. No.: 14/964,341

(22) Filed: Dec. 9, 2015

(51) Int. Cl.
  G06F 3/041 (2006.01)
  G06F 3/0354 (2013.01)
  G06F 3/044 (2006.01)
  G06F 3/045 (2006.01)
  G06Q 30/06 (2012.01)
  H04B 7/26 (2006.01)

(52) U.S. Cl.
  CPC .......... *G06F 3/0412* (2013.01); *G06F 1/3265* (2013.01); *G06F 3/03545* (2013.01); *G06F 3/044* (2013.01); *G06F 3/045* (2013.01); *G06F 3/0414* (2013.01); *G06Q 30/0633* (2013.01); *H04B 7/26* (2013.01); *G06F 2203/04102* (2013.01); *G06F 2203/04108* (2013.01)

(58) Field of Classification Search
  CPC .............. G06F 2203/04102; G06F 2203/04108
  See application file for complete search history.

(56) References Cited

U.S. PATENT DOCUMENTS

| 6,473,072 | B1 * | 10/2002 | Comiskey | B41J 3/4076 345/107 |
| 6,866,760 | B2 * | 3/2005 | Paolini, Jr. | G02F 1/167 204/450 |
| 8,461,725 | B1 * | 6/2013 | Stubbs | H01H 9/54 307/140 |
| 2004/0159762 | A1 * | 8/2004 | Ghosh | G06F 1/16 248/351 |
| 2005/0106538 | A1 * | 5/2005 | Freeman | G09B 5/02 434/167 |
| 2006/0244737 | A1 * | 11/2006 | Dodge | G06F 3/039 345/179 |
| 2007/0298387 | A1 * | 12/2007 | McIlvain | G09B 5/02 434/163 |
| 2008/0005423 | A1 * | 1/2008 | Jacobs | A61B 5/0002 710/62 |
| 2009/0283342 | A1 * | 11/2009 | Schediwy | G06F 3/044 178/19.03 |
| 2009/0315861 | A1 * | 12/2009 | Zhang | G06F 3/03545 345/179 |
| 2012/0062503 | A1 * | 3/2012 | Zhuang | G06F 3/044 345/174 |
| 2013/0285970 | A1 * | 10/2013 | Ahn | G06F 3/044 345/173 |

* cited by examiner

Primary Examiner — Shaheda Abdin
(74) Attorney, Agent, or Firm — Lindauer Law, PLLC

(57) ABSTRACT

A user device includes an unpowered display and a touch sensor. User input such as touching or writing on the unpowered display with a stylus produces visual indicia indicative of the input. A touch sensor is used to acquire touch data indicative of the user input. The touch data may be sent wirelessly to another device, such as a server for further processing.

20 Claims, 10 Drawing Sheets

TOUCH ENABLED USER DEVICE WITH UNPOWERED DISPLAY

BACKGROUND

Many systems may accept user input to facilitate operation. For example, users may provide input to control home automation systems, enter orders with an online merchant, and so forth. These systems benefit from the presence of user devices to accept input. By producing low cost and robust user input devices, the user devices may be more widely deployed, resulting in user input being more easily acquired in a fashion which is convenient to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
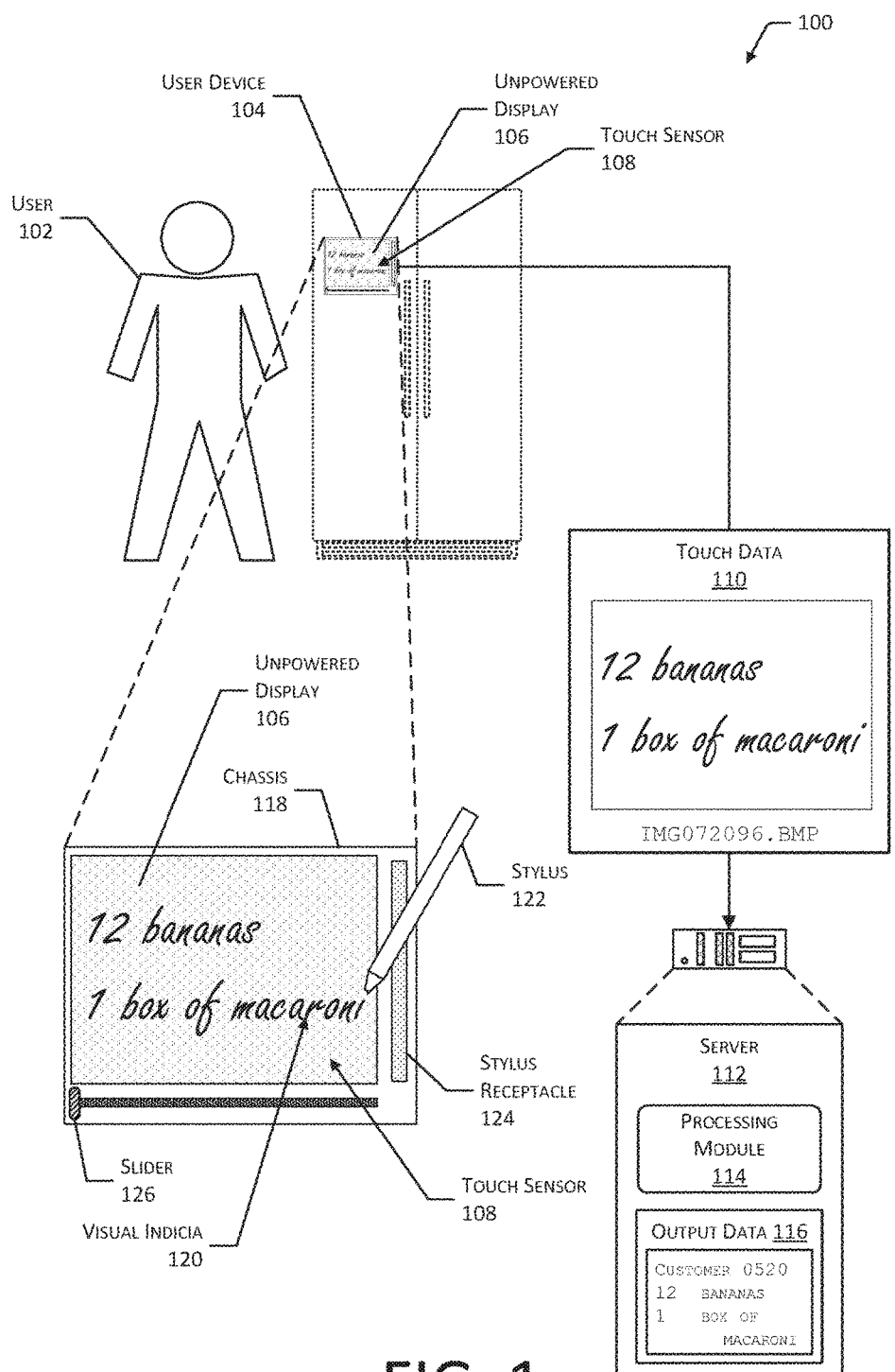
FIG. 1 is an illustrative system including a user device with an unpowered display and a touch sensor that sends touch data to a server, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

User input to computerized systems is used to control or direct the operation of those systems. User input may be translated into a computer-usable data using a variety of devices including, but not limited to keyboards, microphones, mice, touch sensors, and so forth. These systems may range from discrete hardware devices, such as home automation devices, to complicated systems, such as a fleet of servers operated by an online merchant.

The functionality and convenience of many of these systems may be improved by allowing the user to more easily provide that input. For example, it may be more convenient for a user while cooking to be able to quickly and easily place an order to replenish an item that has been consumed.

Traditional user input devices such as microphones and touchscreen devices may not be suitable for use in some situations. For example, a microphone listening for speech in a noisy environment such as in a kitchen during a party may not provide user input with a desired level of accuracy. In another example, touchscreen devices that use an active electronic display and touch sensors are relatively costly.

Described in this disclosure is a user device that utilizes an unpowered display to provide visual feedback to a user's touch with a finger or stylus while a touch sensor detects touches to the unpowered display and produces touch data. By providing visual feedback, the user experience and accuracy of the input may be improved. The touch data, such as a serialized listing of touch points or an image, may then be sent to a server and processed to produce output data. For example, the user may use a stylus to write on the unpowered display "12 bananas". Touch data representing this handwriting may be sent to a server, which may then generate an order to deliver 12 bananas to the address associated with the user's account.

The unpowered display is able to produce a visual indicia or mark without the use of electronic components. In one implementation, the unpowered display may comprise magnetic particles in a liquid suspension that are drawn to a surface of the unpowered display by way of a magnet in the stylus. In another implementation, the unpowered display may comprise a "magic slate" which uses sheets of plastic over a waxy substrate of a contrasting color. In yet another implementation, the unpowered display may comprise a photosensitive paint that undergoes a color change when exposed to illumination from a light on the stylus. Other unpowered display technologies may also be used. The unpowered display is erasable and reusable. For example, the marks made on the unpowered display may be removed and subsequent marks may be made. In the example where the unpowered display comprises magnetic particles or the "magic slate", a moveable slider may be provided. When actuated, this mechanism may erase the visible indicia present on the unpowered display. In some implementations the erasure may be complete, while in other implementations the erasure may be partial. For example, a "ghost" or faint afterimage may remain after activation of the slider.

The touch sensor is able to determine contact or proximity of an object relative to the touch sensor and generate touch data. For example, the touch sensor may comprise an array of electronic elements used to measure one or more of electrical capacitance or resistance at particular points on the array. Based at least in part on changes in the electrical characteristics at that point, a touch may be determined. Other touch sensors may be used. For example, the touch sensor may utilize acoustic, optical, or other mechanisms to determine the presence of a touch.

The touch sensor, or components thereof, is arranged proximate to the unpowered display. In one implementation, the touch sensor may be in front of the unpowered display or behind the unpowered display. For example, when in front of the unpowered display, a capacitive touch sensor may detect changes in capacitance due to the presence of the stylus or the user's finger. In another implementation, the touch sensor may include components on both the front and the back of the display. Those portions of the touch sensor that are arranged in front of the unpowered display may be transparent, such that the visual indicia or markings on the unpowered display are visible.

The touch data, or data based at least in part on the touch data may be sent to an external device. In one implementation, a wireless communication interface may be used to send the touch data to a server. The server may then process the touch data and generate output data 116. Handwriting recognition techniques may be used to process the touch data and generate output data indicative of the information handwritten by the user on the unpowered display. For example, the handwritten message may be "12 bananas" and "1 box of macaroni". The server may determine the text in the handwritten message. Once determined, the text may be used to generate an order. For example, an order to ship 12 bananas and one box of macaroni and cheese of a kind previously purchased may be placed.

In some implementations, data from various sensors may be used to control operation of the user device. For example, the stylus sensor may detect removal of the stylus from a stylus receptacle on the user device. Upon detection of the removal, electronic components of the user device may be transitioned from a low power mode to a higher power operational mode. For example, the clock speed of a processor within the user device may be increased. In another example, one or more sensors may determine movement or activation of the slider. Continuing the example, movement of the slider may trigger the sending of touch data to an external device, such as the server.

By eliminating the use of an active electronic display to provide feedback to the user and their input, the user device described in this disclosure provides a low-cost and rugged unit. As a result, the user device may be deployed in a wide variety of setting to acquire touch data representative of user input. The touch data may then be passed along to another device, such as a server, host computer, and so forth. Based at least in part on the touch data, systems may be controlled, actions may be initiated, and so forth.

Illustrative System

FIG. 1 is an illustrative system 100 for acquiring user input, according to one implementation. A user 102 may wish to provide input to a system. For example, the user 102 may wish to order some groceries, change the temperature in their home, sketch a design for a custom piece of furniture, and so forth. One or more of the user devices 104 may be available for use by the user 102. The user device 104 comprises an unpowered display 106 and a touch sensor 108. The user device 104 may be provided in a variety of sizes and form factors. For example, the user device 104 may be rectangular with the unpowered display 106 having dimensions of approximately 250×200 mm, and may include a mounting mechanism such as a magnet or pressure sensitive adhesive that allows it to be placed on a surface such as a refrigerator in the kitchen of the user 102.

The unpowered display 106 is able to produce a visual indicia or a mark without the use of electronic components. The visual indicia may later be erased or substantially diminished such that the unpowered display 106 may be reused or repeatedly used for later input. The unpowered display 106 is configured such that the visible mark is removable without damage to the unpowered display 106.

In one implementation, the unpowered display may comprise magnetic particles in a liquid suspension that are drawn to a surface of the unpowered display by way of a magnet in the stylus. The unpowered display in this implementation may comprise one or more cavities within which the magnetic particles in the liquid suspension are maintained. For example, a transparent, translucent, or otherwise non-opaque front panel may form a cavity in conjunction with a back panel. The liquid including grains of a magnetic material such as iron may be contained in the cavity between the front panel and the back panel. By utilizing a magnet proximate to the front panel, at least a portion of the mind of particles may be drawn closer to an inner surface of the front panel where they form the visible indicia. For ease of use, the magnet may be incorporated into a stylus which may be grasped by a user. To erase or otherwise diminish the visible indicia, an erasing magnet may be drawn across the opposing side, such as proximate to or along the back panel to move the magnetic particles away from the inner surface of the front panel.

In another implementation, the unpowered display may comprise a "magic slate". The unpowered display in this implementation may include a cover sheet. The cover sheet may comprise a flexible transparent material such as a clear plastic, cellophane, glass, and so forth. An intermediate sheet is placed behind the cover sheet. The intermediate sheet may comprise a flexible opaque material having a first color. For example, the intermediate sheet may comprise a piece of white paper. In another example, the intermediate sheet may comprise a plastic or metal. A substrate is placed behind the intermediate sheet. The substrate comprises a waxy material having a second color different from the first color of the intermediate sheet. For example, where the intermediate sheet comprises white paper, the substrate may comprise paraffin wax that has been colored black. The waxy material may comprise a lipid containing carbon atoms that is malleable near ambient temperatures. In some implementations the waxy material may melt at temperatures above 45 degrees Centigrade. The waxy material may be insoluble in water, but soluble in an organic, nonpolar solvent. In other implementations, waxy materials such as bees wax, Montan wax, polyethylene derived wax, carnauba wax obtained from *Copernicia prunifera*, and so forth may be used.

By pressing down on the cover sheet, such as with the tip of the stylus, or edge of a fingernail, the visual indicia may be presented as the intermediate sheet comes into closer contact with substrate. To erase or otherwise diminish the visible indicia, the intermediate sheet may be briefly pulled away from the substrate.

In yet another example, the unpowered display may comprise a photosensitive paint that undergoes a color change when exposed to illumination from a light on the stylus. For example, a front surface of the unpowered display may be coated with a photosensitive paint. Upon exposure to ultraviolet light, the photosensitive paint may temporarily change color. The stylus may emit ultraviolet light from a tip, such as produced by a light emitting diode. To erase or otherwise diminish the visible indicia, the front surface of the unpowered display may be exposed to ultraviolet light or light of another wavelength. In some implementations, the photosensitive paint may revert to substantially the same color after period of time. For example, the photosensitive paint may include phosphors which are temporarily energized to emit light emitted by the stylus. Other unpowered display technologies may also be used in other implementations. In yet another example, the unpowered display 106 may comprise a dry erase board for use in conjunction with a dry erase marker.

The touch sensor 108 is configured to detect one or more of presence, proximity, or force produced by an object such as a stylus or user's finger. A touch sensor 108 may utilize one or more of measurement of electrical characteristics, optical effects, acoustic effects, or other phenomena. For example, the touch sensor 108 may utilize an array of capacitive elements separated by an insulator to determine presence of an object based on a change in electrical capacitance of a particular capacitive element. In another example, the touch sensor 108 may utilize an array of resistive elements to determine presence of an object based on a change in electrical resistance of a particular resistive element. In yet another example, the touch sensor 108 may utilize optical effects such as a change to total internal reflectance to determine the presence of a touch to a surface.

The touch sensor 108 may be electrically powered during at least a portion of operation. For example, the touch sensor 108 may require electrical power to determine touches, may use electrical power to read-out information from a sensor element that does not require a power source, and so forth.

The touch sensor 108 provides touch data 110 as output. The data 110 may be expressed in a variety of data formats. In one implementation, the touch data 110 may comprise a serialized listing of points on a touch sensor array that have detected a touch. In another implementation, such as depicted here, the touch data 110 may comprise an image, such as a bitmap. In yet another implementation, the touch data 110 may be expressed as a vector or set of vector values.

The touch data 110 may be sent to another device external to the user device 104. For example, the touch data 110 may be sent using a wireless communication interface to a wireless access point, which in turn transfers the touch data 110 via a network to a server 112. The server 112 may include processors, memory, and other devices suitable for executing a processing module 114. The processing module 114 is configured to use the touch data 110 to generate output data 116. For example, the processing module 114 may utilize handwriting recognition techniques such as artificial neural networks, feature extraction, classifiers, and so forth to generate machine-readable output. In another example, the processing module 114 may send an image based on the touch data 110 to a human operator for processing.

The output data 116 may comprise one or more of a string representative of the user's input, data associated with the user input, data indicative of a user account associated with the user device 104, and so forth. For example, the touch data 110 may include information such as a media access control (MAC) address or other identifier that is used to designate a particular user device 104. The processing module 114 may look up the MAC address in a data store to determine a user account associated with that particular user device 104. The processing module 114 may then recognize the hand writing in the touch data 110 to generate a string of data. The output data 116 may comprise information indicative of the user account and the handwritten information. For example, as depicted in FIG. 1, the output data 116 may indicate that customer number 0520 has provided input with the string "12 bananas <line break>1 box of macaroni". The output data 116 may be further processed to initiate one or more actions. Continuing this example, in order may be placed on the user's account for 12 bananas in one box macaroni, each of a type has been previously ordered by the user account.

In some implementations the server 112 or another device may send information to another device associated with the user 102, responsive to the touch data 110. For example, the server 112 may send a notification to the smartphone or table of the user 102 indicating that the order has been received and is being processed.

With regard to the user device 104, a chassis 118 provides an enclosure within which various components of the user device 102 may be contained or affixed to. The unpowered display 106 is located on a front face of the user device 104 such that it is accessible to the user 102 during normal use. The user 102 may produce visual indicia 120 or marks upon the unpowered display 106. In one implementation, a stylus 122 may be employed by the user 102 to produce the visual indicia 120 on the unpowered display 106.

When not in use, the styles 122 may be stored at least partially within a stylus receptacle 124. In other implementations, other types of stylus retention mechanisms may be utilized. For example, the stylus 122 may be held proximate to the chassis 118 when not in use by way of a hook and loop fastener. In other examples, the stylus 122 may be held proximate to the chassis 118 by utilizing one or more of a magnet, mechanical retention features such as a clip, and so forth.

A touch sensor 108 is configured to acquire data associated with the production of the visual indicia 120. For example, the touch sensor 108 may comprise components that are located in front of the unpowered display 106, behind the unpowered display 106, or both in front and behind the unpowered display 106.

The unpowered display 106 may utilize a display erase mechanism to remove visual indicia 120 from the unpowered display 106. For example, when the unpowered display 106 uses magnetic particles to produce the visual indicia 120, a magnet may be drawn across the back panel of the unpowered display 106 by way of a slider 126 to erase the visual indicia 120. The display erase mechanism may be actuated at least in part by the user 102 manipulating a slider 126. For example, the user 102 may move the slider 126 from left to right to erase the visual indicia 120 present on the unpowered display 106. The nature of the erasure may be according to the mechanism of the unpowered display 106 involved. For example, the unpowered display using magnetic particles may use an erasing magnet moved by the slider 126 to move the particles, resulting in erasure. In another example, the unpowered display using a "magic slate" may use a spacer moved by the slider 126 to remove visual indicia 120, resulting in erasure. Following the erasure, the user 102 may use the stylus 122 to create new visual indicia 120 on the unpowered display 106. In some implementations, such as described below, a sensor may be used to detect displacement of the slider 126. Upon a determination of the displacement, the touch data 110 may be one or more of stored or sent.

In some implementations it may be advantageous to provide output to the user 102, such as confirmation that one or more events have taken place. The user device 104 may include one or more output devices 218 to provide information to the user 102. For example, the output device 218 may include an LED that is briefly illuminated to indicate that the touch data 110 has been successfully sent to the server 112. In another example, the output device 218 may include a speaker buzzer that produces an audible signal indicating that the server 112 has successfully processed the touch data 110.

In another implementation, a message may be sent to another device associated with the user 102 to provide confirmation or other output associated with the use of the user device 104. For example, the server 112 may send a message to a smartphone or tablet device associated with the same user account of the user 102.

An example depicted here, the visual indicia 120 resulting from user input comprises handwriting in English with Arabic numerals. However, the user device 104 may be used to acquire user input and any number of different languages or using any number of different iconography. For example, the user 102 may use the stylus 122 to draw a pair of arrows directed upwards side-by-side on the unpowered display 106. The touch sensor 108 generates the corresponding touch data 110 which may then be processed by the server 112 to issue a command to a home automation system. The command to the home automation system may be to increase temperature by 2°.

Figure 2:
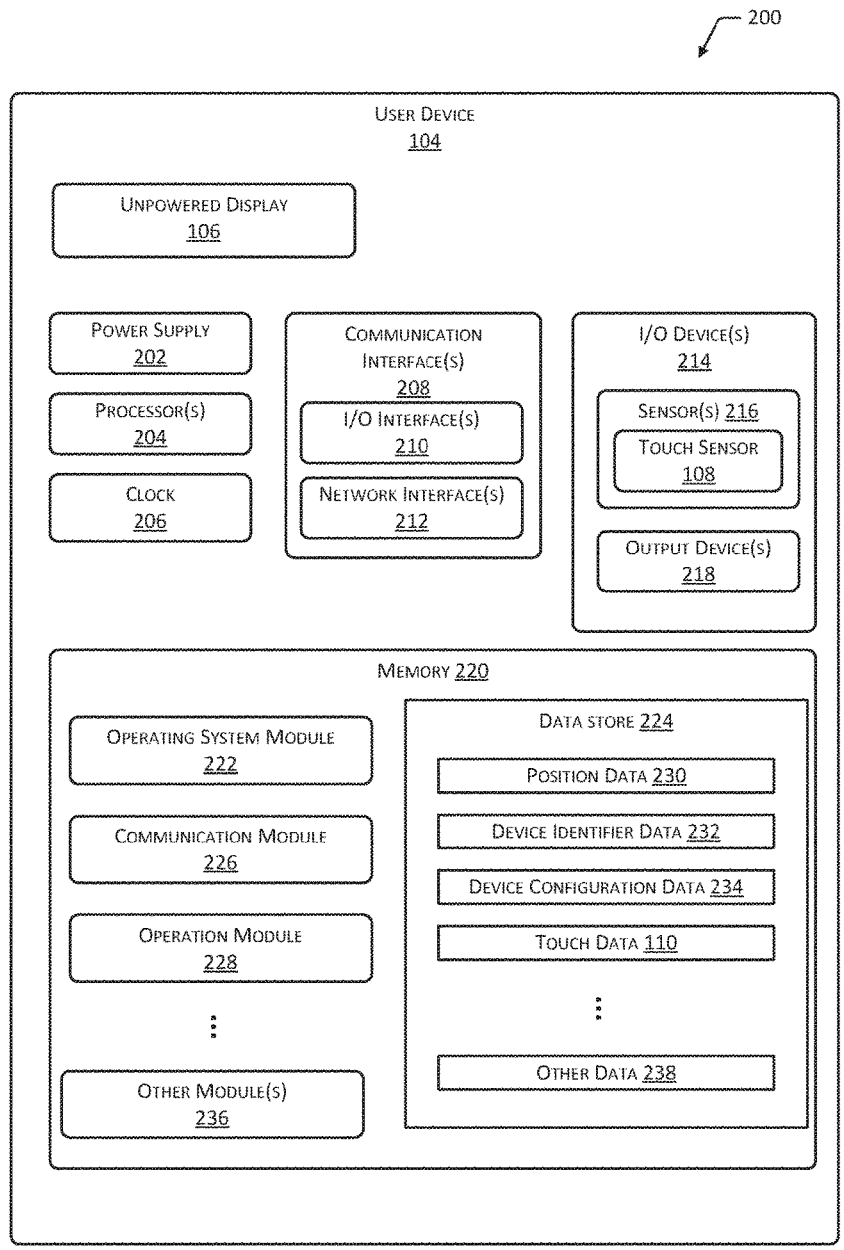
FIG. 2 illustrates a block diagram of the user device, according to one implementation.

FIG. 2 illustrates a block diagram 200 of the user device 104, according to one implementation. As described above, the user device 104 includes an unpowered display 106. The unpowered display 106 may be unpowered such that it does not draw electrical power during operation.

One or more power supplies 202 are configured to provide electrical power suitable for operating the components in the user device 104. In some implementations, the power supply 202 may include a single use battery, a rechargeable battery, a fuel cell, a photovoltaic cell, a wireless power receiver, a thermoelectric generator, and so forth.

The user device 104 may include one or more hardware processors 204 (processors) configured to execute one or more stored instructions. The processors 204 may comprise one or more cores. One or more clocks 206 may provide information indicative of date, time, ticks, and so forth. For example, the processor 204 may use data from the clock 206 to generate a timestamp, trigger a preprogrammed action, and so forth. In some implementations, one or more of the components described with regard to the user device 104 may be implemented by one or more of an application specific integrated circuit (ASIC), system-on-a-chip (SOC), a microcontroller, and so forth.

The user device 104 may include one or more communication interfaces 208 such as I/O interfaces 210, network interfaces 212, and so forth. The communication interfaces 208 enable the user device 104, or components thereof, to communicate with other devices or components. The communication interfaces 208 may include one or more I/O interfaces 210. The I/O interfaces 210 may comprise interfaces such as Inter-Integrated Circuit (I2C), Serial Peripheral Interface bus (SPI), Universal Serial Bus (USB), RS-234 interface, and so forth.

The I/O interface(s) 210 may couple to one or more I/O devices 214. The I/O devices 214 may include input devices such as one or more sensors 216. The sensors 216 may include the touch sensor 108, buttons, proximity sensors, switches, and so forth. For example, switches may be used as position sensors to indicate a position of the slider 126. The I/O devices 214 may also include output devices 218. For example, the output devices 218 may include one or more of a light emitting diode, a liquid crystal element, a mechanical flag, an electroluminescent light, an electrophoretic element, a cholesteric element, a speaker, a haptic output device, and so forth. For example, liquid crystal element may comprise a segmented display that is able to display a particular icon. In some embodiments, the I/O devices 214 may be physically incorporated with the user device 104 or may be externally placed.

The network interfaces 212 are configured to provide communications between the user device 104 and other devices, such as routers, access points, other user devices 104, and so forth. The network interfaces 212 may include devices configured to couple to personal area networks (PANs), local area networks (LANs), wide area networks (WANs), and so forth. For example, the network interfaces 212 may include devices compatible with Ethernet, Wi-Fi®, Bluetooth®, ZigBee®, 2G, 4G, LTE, and so forth.

The user device 104 may also include one or more busses or other internal communications hardware or software that allow for the transfer of data between the various modules and components of the user device 104.

As shown in FIG. 2, the user device 104 includes one or more memories 220. The memory 220 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the user device 104. A few example functional modules are shown stored in the memory 220, although the same functionality may alternatively be implemented in hardware, firmware, or as a system on a chip (SOC).

The memory 220 may include at least one operating system OS module 222. The OS module 222 is configured to manage hardware resource devices such as the I/O interfaces 210, the network interfaces 212, the I/O devices 214, and provide various services to applications or modules executing on the processors 204. The OS module 222 may implement a variant of the FreeBSD™ operating system as promulgated by the FreeBSD Project, other UNIX™ or UNIX-like variants, a variation of the Linux™ operating system as promulgated by Linus Torvalds, the Windows® operating system from Microsoft Corporation of Redmond, Wash., or other operating system.

Also stored in the memory 220 may be a data store 224 and one or more of the following modules. These modules may be executed as foreground applications, background tasks, daemons, and so forth. The data store 224 may use a flat file, database, linked list, tree, executable code, script, or other data structure to store information. In some implementations, the data store 224 or a portion of the data store 224 may be distributed across one or more other devices including the computing devices 104, network attached storage devices, and so forth.

A communication module 226 may be configured to establish communications with one or more of an access point, other computing devices 104, or other devices. The communications may be authenticated, encrypted, and so forth.

The memory 220 may store an operation module 228. The operation module 228 is configured to generate the touch data 110 from the touch sensor 108. In some implementations, the touch sensor 108 may include the operation module 228 and may pass the touch data 110 along an I/O interface 210. Once acquired by the operation module 228, the communication interface 208 may be used to send the touch data 110 to another device external to the user device 104.

The operation module 228 may also be configured to transition the user device 104 between various power modes. For example, the sensors 216 may include a stylus sensor that is used to determine if a stylus has been removed from the user device 104. Upon removal, the operation module 228 may transition the user device 104 from a low power mode to an operational mode that consumes more electrical power than the low power mode. Likewise, placement of the stylus to the user device 104 may result in transitioning from the operational mode to the low power mode, once tasks such as sending the touch data 110 have been completed. For example, the operational mode may result in the clock 206 operating at a higher frequency than the low power mode. In some implementations, one or more of the functions of the operation module 228 may be performed at least in part by a power management integrated circuit (PMIC).

The operation module 228 may be configured to determine when to send the touch data 110 to the external device, such as the server 112. For example, the sensors 216 may include one or more position sensors that are used to generate position data 230. The position data 230 may be used to determine motion of a slider. Position data 230 that indicates that the slider has been activated to erase the unpowered display 106 may be used to trigger to one or more of: storage of the touch data 110 in the data store 224, sending of the touch data 110 to another device external to the user device 104, or performing or initiating other actions.

The position data 230 may comprise information indicative of a position of the slider. In some implementations, the position data 230 may indicate that the slider is located at a first position, not located at the first position. For example, the position data 230 may be obtained from a switch located at the first position. When the slider 126 is at the first position, the switch may be closed, generating a signal. The signal may be interpreted as position data 230 indicating the presence of the slider 126 at the first position. In other implementations the position data 230 may be indicative of a position of the slider. For example, the position data 230 may be obtained from an optical encoder or linear resistor that is coupled to or part of the slider 126. Movement of the slider 126 may result in movement of an optical encoder element or change in electrical resistance of the linear resistor, generating a signal. The signal may be interpreted as position data 230 indicating the slider is located ⅓ of the distance between a first position and a second position.

The data store 224 may include device identifier data 232. The device identifier data 232 may be used to distinguish one user device 104 from another. In one implementation, the device identifier data 232 may comprise a MAC address. In some implementations, the device identifier data 232 may include or otherwise be associated with data indicative of a particular user account. For example, the device identifier data 232 may comprise a string that is derived from the MAC address and an account number of the user account associated with the user device 104. The device identifier data 232 may be transmitted with, or incorporated into, the touch data 110 for sending to an external device. For example, the touch data 110 may comprise a file having a header that includes the device identifier data 232.

Operation of the user device 104 may be controlled at least in part by device configuration data 234 that may be stored in the data store 224. The device configuration data 234 may include wireless network credentials, parameters associated with minimizing power consumption of the user device 104, and so forth. For example, device configuration data 234 may include parameters that specify that the network interface 212 is to be powered up after the touch data 110 has been obtained and is ready for sending.

In some implementations, the operation module 228 may perform some processing of the touch data 110. For example, the operation module 228 may convert serialized data indicative of touch points into a bitmap.

Other modules 236 may also be present in the memory 220, as well as other data 238 in the data store 224. For example, a notification module may be configured to use one or more of the output devices 218 to generate output indicating that the touch data 110 was successfully transmitted to the server 112, the server 112 completed processing of the touch data 110, and so forth.

Figure 3:
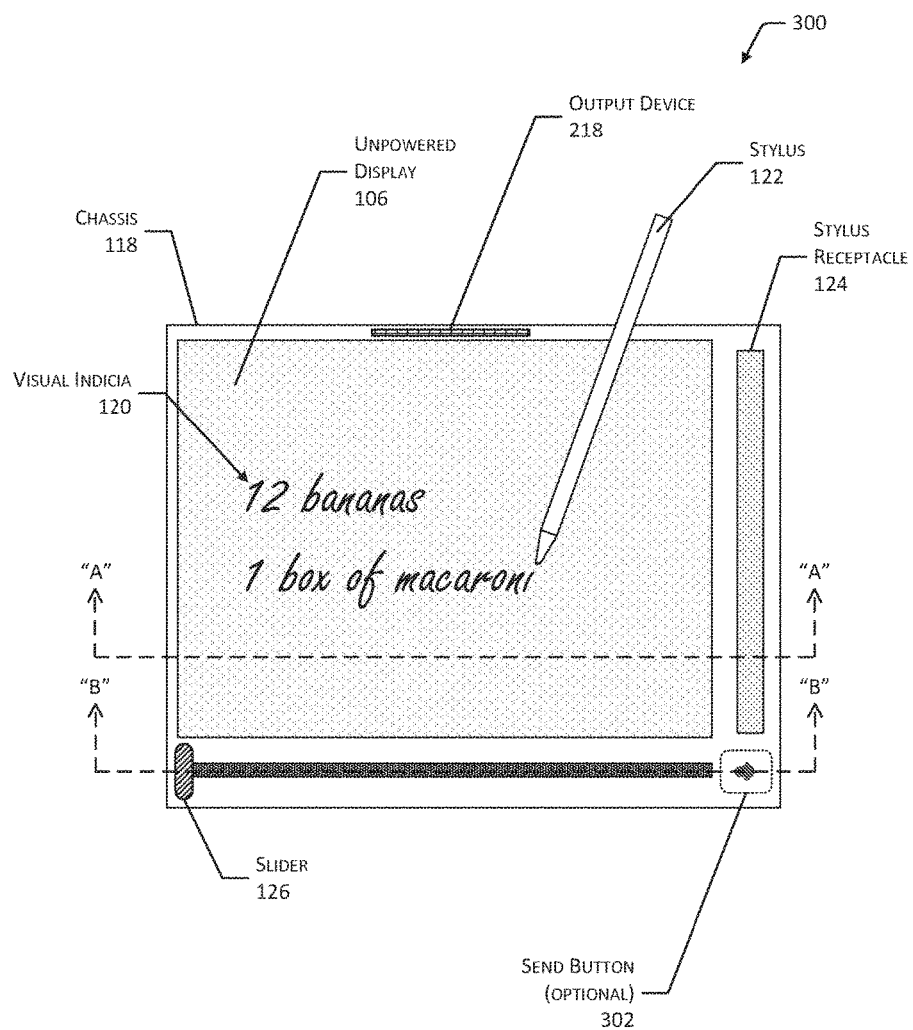
FIG. 3 illustrates a frontal view of the user device, according to one implementation.

FIG. 3 illustrates a frontal view 300 of the user device 104, according to one implementation. In some implementations a send button 302 may be provided instead of, or in addition to, the slider 126. By activating the send button 302, the touch data 110 may be one or more of stored or sent. Also depicted in FIG. 3 are dotted lines A-A and B-B indicating the relative positions depicted by the cross sectional views of FIG. 4 and FIG. 5, respectively.

Figure 4:
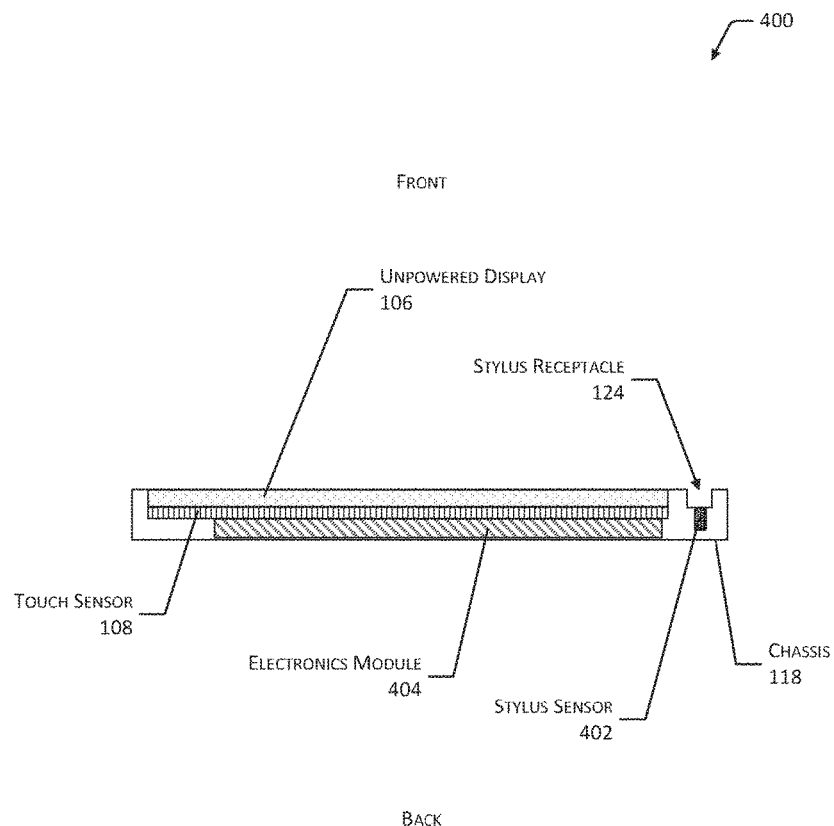
FIG. 4 illustrates a cross sectional view of the user device along line A-A, according to one implementation.
Figure 4:
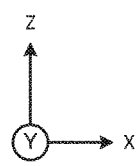

FIG. 4 illustrates a cross sectional view 400 of the user device 104 along line A-A, according to one implementation. In this illustration, the unpowered display 106 is located in front of the touch sensor 108. The touch sensor 108 may be configured to detect a touch as applied by the stylus 122 through the unpowered display 106. For example, the force applied by the stylus 122 to the surface of the unpowered display 106 may be conveyed at least in part to the touch sensor 108 below that utilizes a resistive sensor that changes electrical resistance in response to the amount of applied force. Located within the chassis 118 and behind the touch sensor 108 may be one or more electronics modules 404. For example, the electronics module 404 may include the power supply 202, the processor 204, the clock 206, the communication interfaces 208, the memory 220, and so forth.

In some implementations the user device 104 may include a stylus sensor 402. The stylus sensor 402 may be used to detect the presence or absence of the stylus 122 at the stylus receptacle 124 or another stylus retention device. For example, the stylus sensor 402 may comprise a magnetometer able to detect the presence of a magnet within the stylus 122 when the stylus 122 is stowed within the stylus receptacle 124. In another example, the style sensor 402 may comprise a switch that is displaced when the stylus 122 is stored at least partially within the stylus receptacle 124.

Output from the stylus sensor 402 may be used to affect various operations of the user device 104. For example, output the stylus sensor 402 may be used to transition the user device 104 between different modes. Continuing the example, the user device 104 may transition one or more of the components therein into a low power mode to conserve electrical power when the stylus 122 is in place, may transition into an operating mode when the stylus 122 is removed from stylus receptacle 124, and so forth. In some implementations, output from the stylus sensor 402 may be utilized to perform other actions, such as sending the touch data 110 to an external device.

In some implementations, the style sensor 402 may act as an on/off switch for all the electronic components of the user device 104. For example, removal of the stylus 122 may result in electronic components of the user device 104 being turned on while placement of the stylus 122 may result in the electronics of the user device 104 being instructed to shut down. In some implementations, the shutdown may be timed or coordinated such that transmission of the touch data 110 is completed prior to shutdown.

For implementations of the user device 104 that omit the stylus sensor 402 or omit the stylus 122 altogether, other techniques may be used to affect various operations of the user device 104. For example, the touch sensor 108 may be periodically scanned at relatively long intervals such as every 500 ms to determine if a touch is taking place. Responsive to such determination, the user device 104 may perform operations such as resuming operation from a low power mode. In another example, a button, switch, proximity sensor, and so forth may be used to affect the various operations of the user device 104.

Figure 5:
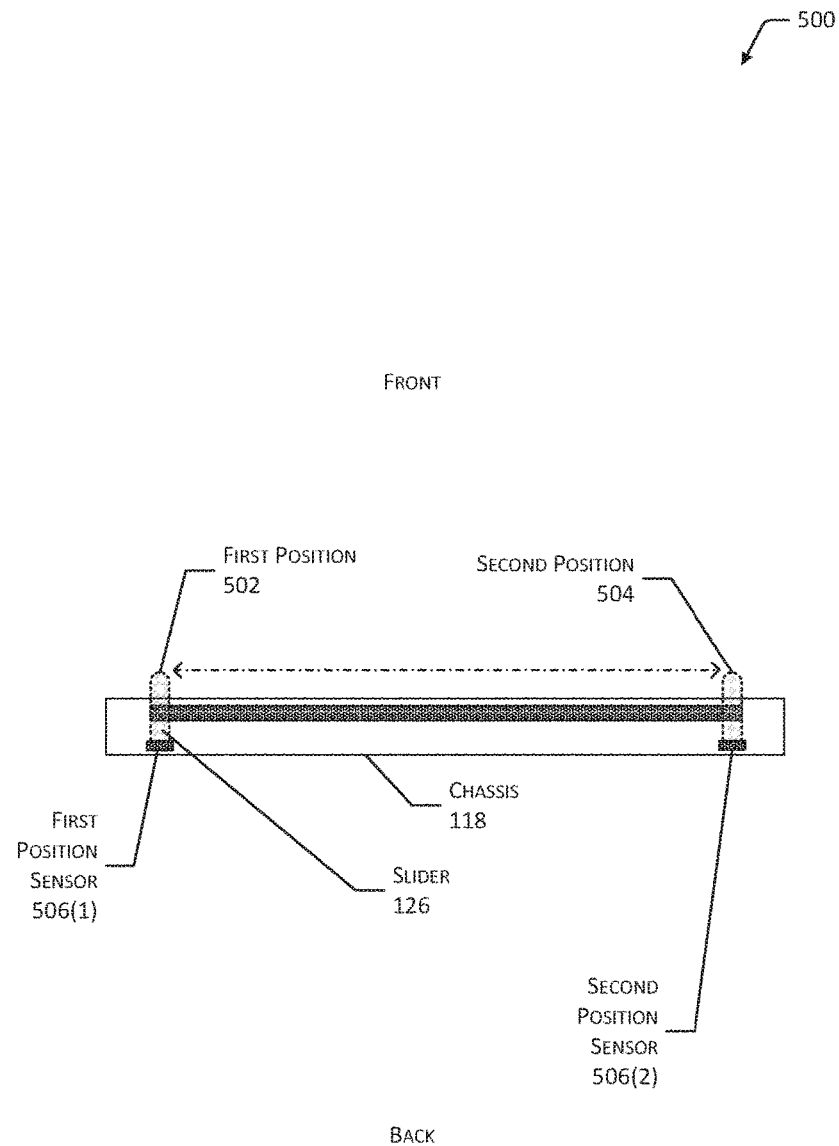
FIG. 5 illustrates a cross sectional view of the user device along line B-B, according to one implementation.

FIG. 5 illustrates a cross sectional view 500 of the user device 104 along line B-B, according to one implementation. In this cross-sectional view, the slider 126 is depicted. The slider 126 may be moved from a first position 502 to a second position 504. This movement may be linear, arcuate, and so forth. For example, the slider 126 may move left to right along an X axis of the user device 104. Motion of the slider 126 may cause a display erase mechanism to remove at least a portion of the visual indicia 120 from the unpowered display 106.

One or more sensors 216 may be used to determine one or more of the position or movement of the slider 126 or portion thereof. In this illustration, a first position sensor 506(1) is configured to determine that the slider 126 is present at the first position 502. Similarly, a second position sensor 506(2) is configured to determine that the slider 126 is present at second position 504. The position sensor 506 may comprise switches, electrical contacts, an optical transmitter and a receiver, a magnetometer, and so forth. For example, the position sensor 506 may comprise an infrared emitter and an infrared detector. An opaque member, such as a portion of the slider 126, may prevent light from the infrared emitter in reaching infrared detector when the slider 126 is proximate thereto.

Operation of the user device 104 may be responsive to output from one or more of the position sensors 506. Responsive to output from the second position sensor 506(2), the operation module 228 may send touch data 110 that is stored in the data store 224. For example, the user 102 may have provided their user input and has now moved the slider 126 to clear the resulting visual indicia 120 and send the touch data 110 to the server 112.

In some implementations, a change in state of a single position sensor 506 may be used to initiate one or more actions. For example, the user device 104 may have a single position sensor 506 that detects the slider 126 at some point, such as a between the first position 502 and the second position 504. The single position sensor 506 may determine the passage of the slider 126 or portion thereof, and a countdown timer may be started. Upon expiration of a countdown timer after a predetermined interval of time, and action may be taken, such as sending the touch data 110 to the server 112.

Figure 6:
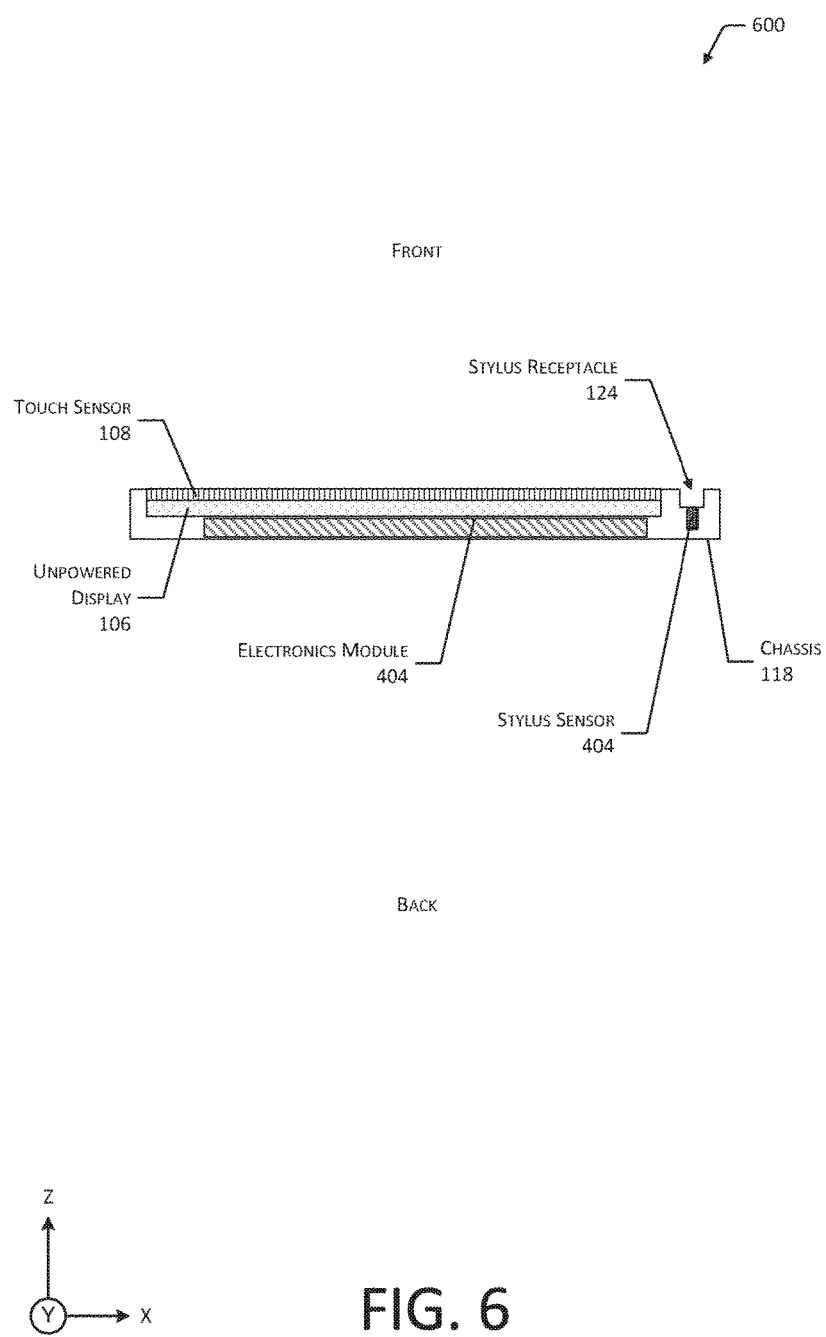
FIG. 6 illustrates a cross sectional view of the user device along line A-A, according to another implementation.

FIG. 6 illustrates a cross sectional view 600 of the user device 104 along line A-A, according to another implementation. In this illustration, the touch sensor 108, or portion thereof, is arranged in front of the unpowered display 106. For example, the touch sensor 108 may comprise a capacitive touch sensor that is transparent to least a portion of the visual indicia 120. The touch sensor 108, or a portion thereof that is in front of the unpowered display 106 is substantially transparent to the visual indicia 120. In some implementations, substantially transparent may indicate that the portion of the touch sensor 108 is transmissive to greater than 50% of the light associated with the visual indicia 120.

In one configuration, the touch sensor 108 may utilize at least a portion of the same structures unpowered display 106, or vice versa. For example, the touch sensor 108 may comprise an array of indium tin oxide (ITO) electrodes that are deposited atop a front sheet of the unpowered display 106. The back panel of the unpowered display 106 may comprise an electrically conductive sheet, such as copper deposited upon the plastic substrate. The electrically conductive sheet that comprise the back panel may act as a ground plane while the ITO electrodes are used to detect capacitance changes associated with the touch of the user 102, the stylus 122, or another object.

Figure 7:
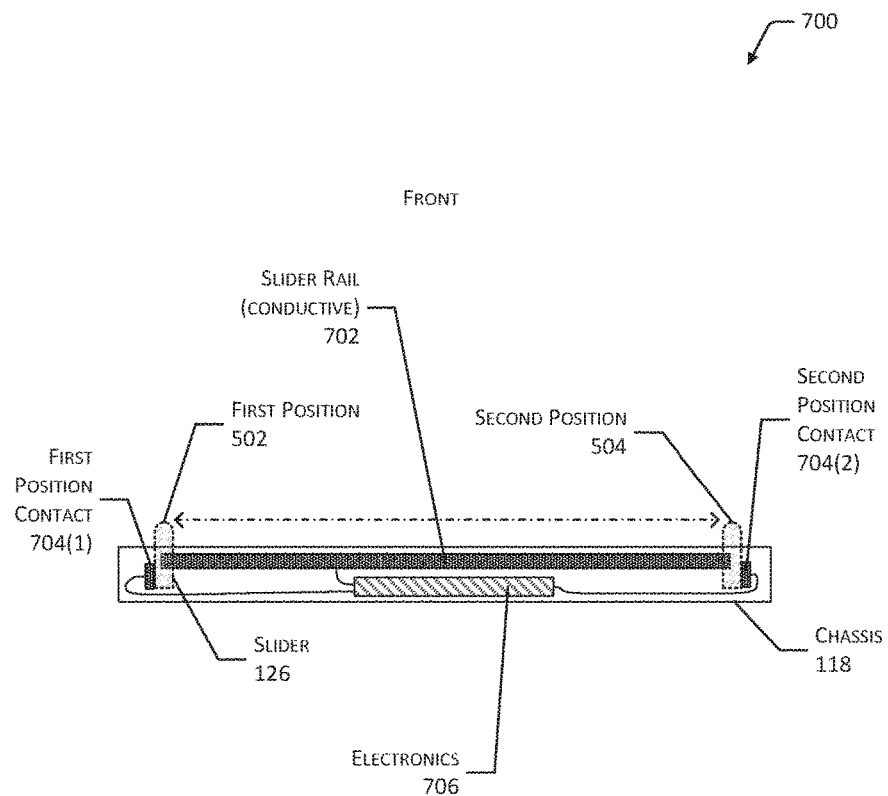
FIG. 7 illustrates a cross sectional view of the user device along line B-B, according to another implementation.

FIG. 7 illustrates a cross sectional view 700 and of the user device 104 along line B-B, according to another implementation. The slider 126 may move along a slider rail 702. The slider rail 702 may comprise an electrically conductive material. In one implementation, the slider rail 702 may be attached to an electrical ground.

A first position contact 704(1) may be positioned such that when the slider 126 is positioned at the first position 502, electrical contact is made between the slider rail 702 and the first position contact 704(1). Similarly, a second position contact 704(2) may be positioned such that when the slider 126 is positioned at the second position 504, electrical contact is made between the slider rail 702 and the second position contact 704(2). Electronics 706 may be used to generate output that indicates an electrically conductive pathway has been established between the slider rail 702 and the first position contact 704(1) or the second position contact 704(2). As described above with regard to FIG. 5, information about the position or the motion of the slider 126 may be used to initiate one or more actions or otherwise affect the operation of the user device 102.

In other implementations, other techniques may be used to determine the motion or relative position of the slider 126. For example, the slider rail 702 may be configured to operate as a linear variable resistor such that as the position of the slider 126 changes from the first position 502 to the second position 504, a change in electrical resistance is produced.

Illustrative Processes

Figure 8:
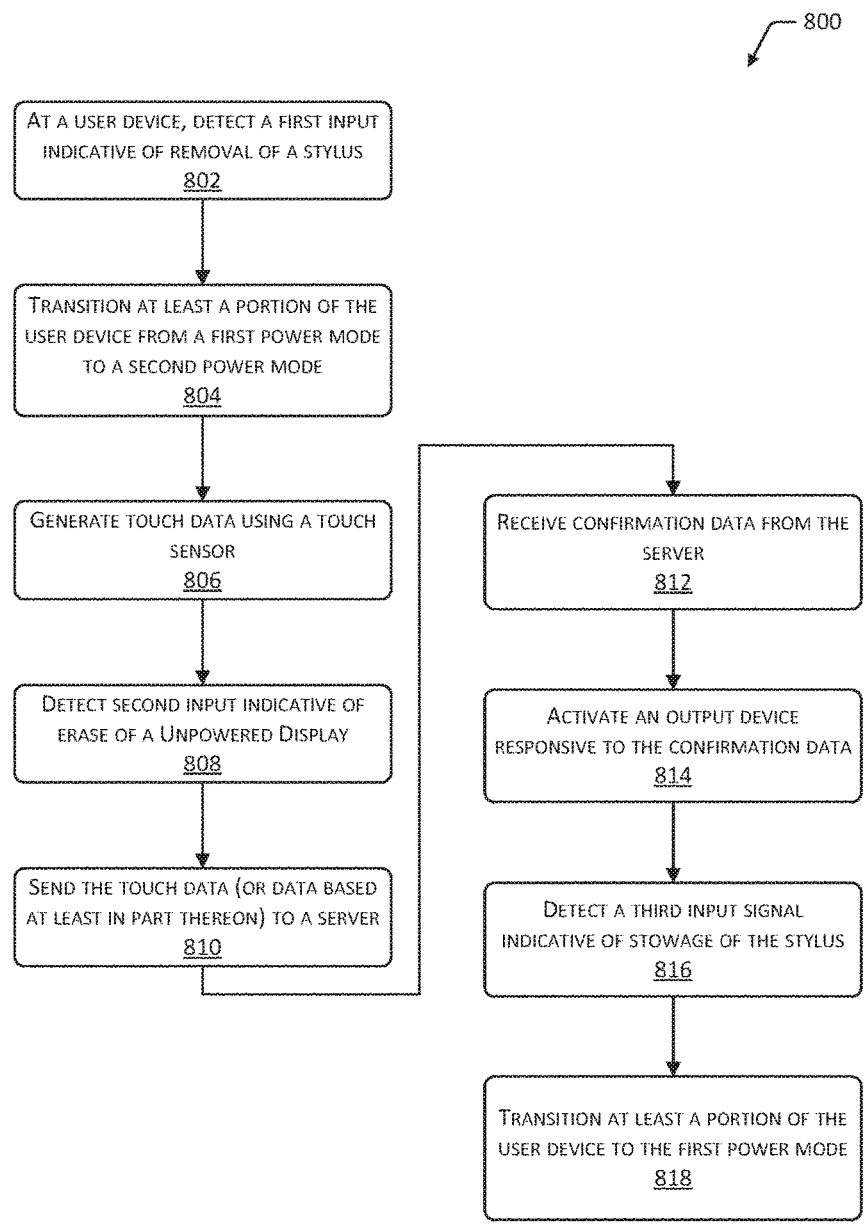
FIG. 8 illustrates a flow diagram of a process to operate the user device, according to one implementation.

FIG. 8 illustrates a flow diagram 800 of a process to operate the user device, according to one implementation. In some implementations, the process may be performed, at least in part, by one or more of the user device 104, the server 112, or another device.

At 802 a first input indicative of removal of a stylus 122 is detected. For example, a signal may be detected from the stylus sensor 402.

At 804 at least a portion of the user device 104 is transitioned from a first power mode to a second power mode. For example, responsive to a signal from the style sensor 402, the power management integrated circuit may place the processor 204 and operational mode ready to process instructions.

At 806, touch data 110 is generated using the touch sensor 108. For example, individual elements of a touch sensor array may be read out to determine the presence or absence of a touch.

At 808 second input indicative of an erase of the unpowered display 106 is detected. For example a signal may be received from one of the position sensors 506, one of the position contacts 704, and so forth indicative of movement of the slider 126.

At 810 the touch data 110, or data based at least in part on the touch data 110, is sent to an external device. For example, the network interface 212 may be used to send the touch data 110 to the server 112.

At 812 confirmation data may be received from the server 112. For example, the server 112 may send an acknowledgment that the touch data 110 was received. In another example, the server 112 may send an acknowledgment that touch data 110 was processed and output data 116 was successfully generated. In yet another example, the server 112 may send an acknowledgment that an action associated with the output data 116 has been initiated, such as the placement of an order for an item or service.

At 814, an output device 218 may be activated responsive to the confirmation data. For example, an LED on the user device 104 may be briefly illuminated with a green light to indicate that an order has been placed.

At 816 a third input signal indicative of the stowage of the stylus 122 may be detected. For example, the stylus sensor 402 may generate a signal indicating that the stylus 122 is within the stylus receptacle 124.

Responsive to the third input signal, at 818 at least a portion of the user device 104 may be transitioned to the first power mode. For example, the processor 204 may be placed into a sleep mode while the network interface 212 completes transmission of the touch data 110 to the server 112. Upon completion of the transmission, the network interface 212 may itself be placed into a sleep mode or other low power mode.

Figure 9:
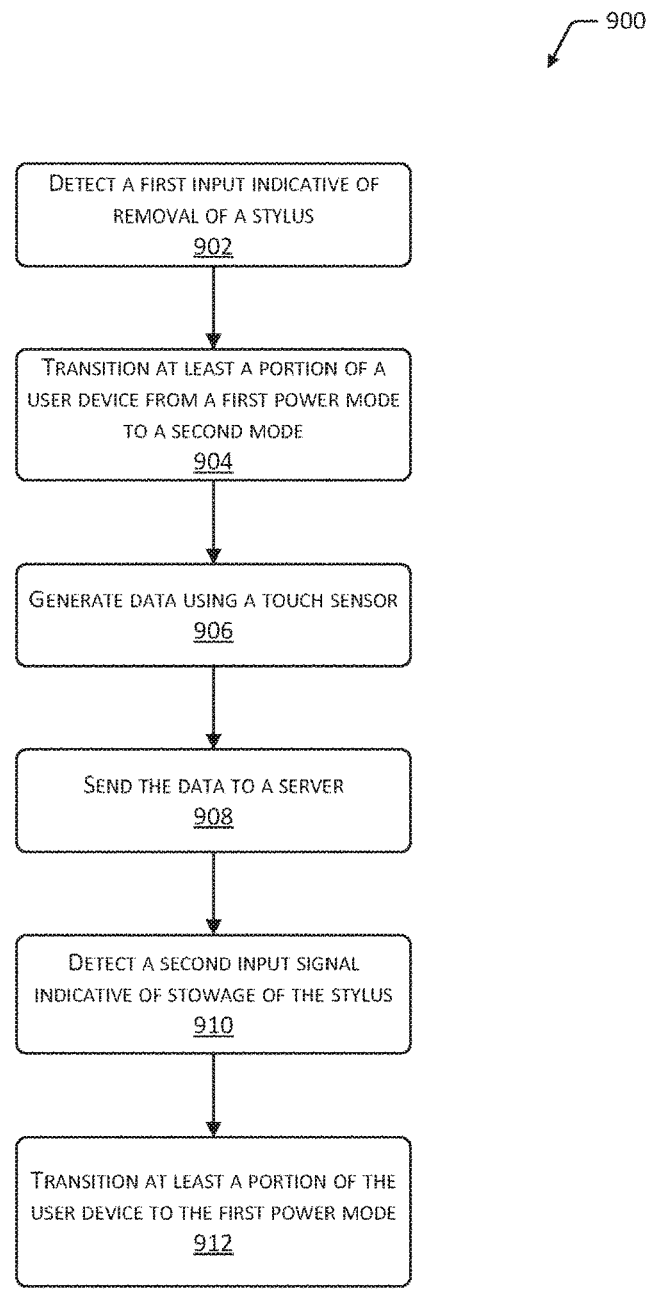
FIG. 9 illustrates a flow diagram of another process to operate the user device, according to another implementation.

FIG. 9 illustrates a flow diagram 900 of another process to operate the user device, according to another implementation. In some implementations, the process may be performed at least in part by one or more of the user device 104, the server 112, or another device.

At 902 a first input indicative of removal of a stylus 122 is detected. For example, a signal may be detected from the stylus sensor 402.

At 904 at least a portion of the user device 104 is transitioned from a first power mode to a second power mode. For example, responsive to a signal from the style sensor 402, the processor 204 may be powered up and enter a state ready to process instructions.

At 906 data is generated using the touch sensor 108. For example, individual elements of a touch sensor array may be read out to determine the presence or absence of a touch and produce touch data 110.

At 908 at least a portion of the data is sent to an external device. For example, the touch data 110 may be sent to the server 112. In some implementations, the touch data 110 may be sent as a complete file, such as at the conclusion of user input. In other implementations, the touch data 110 may be sent continuously or streamed to the external device. For example, with this implementation as the user 102 writes upon the unpowered display 106, the corresponding touch data 110 from the touch sensor 108 is generated and periodically sent, such as at 50 ms intervals.

In some implementations, a set of touch data 110 corresponding to several different instances of user input may be stored for later transmission. For example, five sets of touch data 110, each corresponding to a different incidence of user input, may be stored and transmitted during the same communication session.

At 910 a second input signal indicative of the stowage of the stylus 122 may be detected. For example, the stylus sensor 402 may generate a signal indicating that the stylus 122 is within the stylus receptacle 124.

Based at least in part on the second input signal, at 912 at least a portion of the user device 104 may be transitioned to the first power mode. For example, the electronic components of the user device 102 may be placed into a low power mode.

Figure 10:
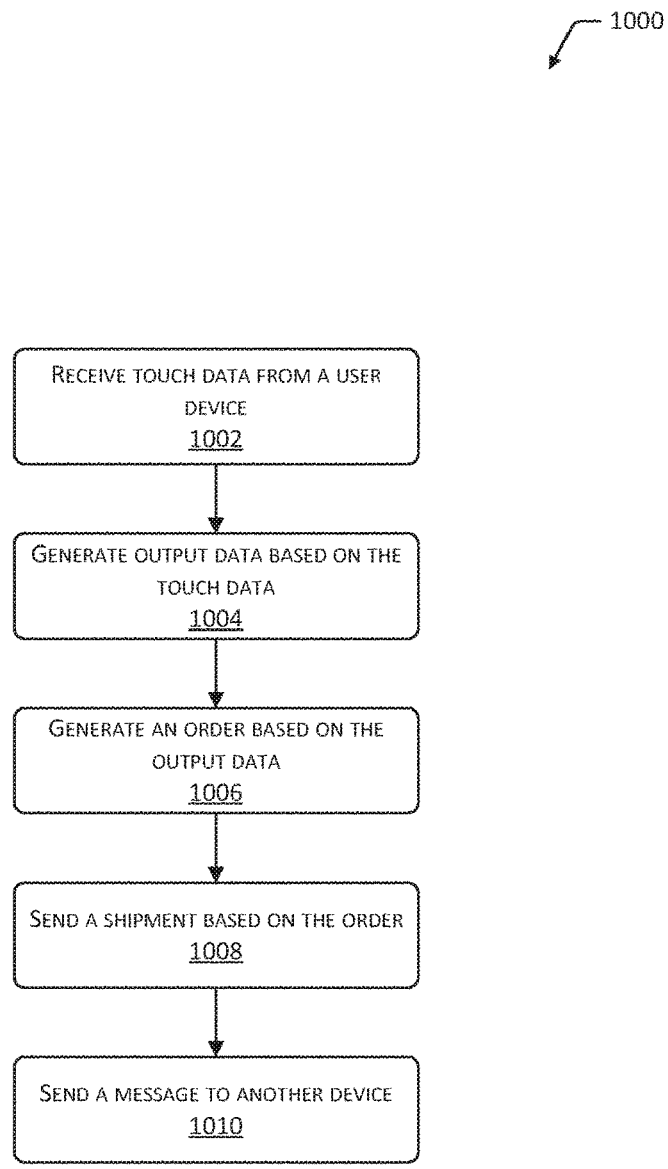
FIG. 10 illustrates a flow diagram of a process to receive touch data from the user device and generate a shipment, according to another implementation.

FIG. 10 illustrates a flow diagram 1000 of a process to receive touch data from the user device and generate a shipment, according to another implementation. In some implementations, the process may be performed at least in part by one or more of the server 112, or another device.

At 1002 touch data 110 is received from a user device 104. For example, the user device 104 may establish a communication session with the server 110 and transmit one or more sets of touch data 110.

At 1004 output data 116 may be generated based at least in part on the touch data 110. For example, the processing module 110 may use handwriting recognition techniques to generate machine-readable data, commands, and so forth.

At 1006 an order may be generated based at least in part on the output data 116. For example, the device identifier data 232 in the touch data 110 may be used to look up a user account associated with the user device 104 that sent the touch data 110. Based on the information in the output data 116, previous purchase history, and so forth, an order for one or more items or services may be generated.

At 1008 a shipment based on the order is sent. Continuing the example, the shipment of the items indicated by the touch data 110 may be sent to an address associated with the user account.

At 1010 a message is sent to another device. For example, a notification indicative of receipt of the order may be sent to a smartphone, tablet, television, or other device associated with the user account corresponding to the user device. In some implementations the message may be sent at one or more of: after receipt by the server 112, after output data 116 is generated, after shipment of an order, and so forth.

By using the devices and the techniques described in this disclosure, ubiquitous user input may be easily and inexpensively acquired. As a result, the user experience may be improved, and overall operation of various systems that rely on user input may be improved.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
   a stylus retention mechanism to hold a stylus, wherein the stylus includes a magnet at a first end;
   a stylus sensor to determine that the stylus is retained by the stylus retention mechanism;
   a magnetic unpowered display comprising:
      a non-opaque front panel;
      a back panel;
      a liquid including grains of a magnetic material, wherein the liquid is contained between the non-opaque front panel and the back panel;
      a slider mechanically coupled to an erasing magnet, wherein movement of the slider from a first position to a second position erases visual indicia presented on the non-opaque front panel by the grains;
      a switch to determine the slider has moved; and
   an output device to provide a confirmation output that touch data has been received;
   a battery to provide electrical power;
   a communication interface;
   a touch sensor arranged in front of the non-opaque front panel of the magnetic unpowered display, wherein the touch sensor is responsive to presence of at least a portion of the stylus;
   a memory storing computer-executable instructions; and
   a processor to execute the computer executable instructions to:
      receive data from the stylus sensor, wherein the data is indicative of the stylus being retained by the stylus retention mechanism;
      responsive to the data from the stylus sensor, transition the processor from a first power mode to a second power mode, wherein while operating in the first power mode the processor consumes less electrical power while operating in the second power mode;
      generate the touch data using the touch sensor;
      receive a signal from the switch;
      responsive to the signal, send the touch data to an external device using the communication interface; and
      provide the confirmation output using the output device to confirm that the touch data has been received by the external device.

2. The device of claim 1, further comprising:
   the processor to execute the computer executable instructions to:
      receive second data from the stylus sensor, wherein the second data is indicative of the stylus being removed from the stylus retention mechanism; and
      responsive to the second data from the stylus sensor, transition one or more of the touch sensor or the memory from the first power mode to the second power mode.

3. The device of claim 1, wherein the touch sensor comprises:
   an array of force sensitive resistors; and
   electronics to measure electrical resistance at different points on the array.

4. A device comprising:
   an unpowered display to produce without electrical power a visible mark responsive to user input;
   a stylus retention mechanism to hold a stylus;
   a stylus sensor to determine presence of the stylus with regard to the stylus retention mechanism;
   an output device to provide a confirmation output that touch data has been received;
   a power supply;
   a memory storing computer-executable instructions;
   a touch sensor to generate the touch data corresponding to the user input, wherein the touch sensor is powered by the power supply; and
   a communication interface, wherein the communication interface is powered by the power supply,
   a processor, powered by the power supply, to execute the computer-executable instructions to:
      determine removal of the stylus from the stylus retention mechanism using the stylus sensor;
      transition one or more of the memory, the processor, the touch sensor, or the communication interface from a first mode to a second mode, wherein the first mode uses less electrical power than the second mode;
      responsive to data indicative of a change in position of a moveable slider, use the communication interface to send the touch data stored in the memory to an external device; and
      provide the output using the output device to confirm that the touch data has been received by the external device.

5. The device of claim 4, wherein the touch sensor comprises one or more conductive elements that are substantially transparent to visible light, and further wherein the touch sensor is arranged in front of the unpowered display.

6. The device of claim 4, wherein the touch sensor is arranged behind the unpowered display.

7. The device of claim 4, wherein the unpowered display comprises:
   a non-opaque front panel;
   a back panel; and
   a liquid including grains of a magnetic material, wherein the liquid is contained between the front panel and the back panel.

8. The device of claim 4, wherein the unpowered display comprises:
   a cover sheet comprising a flexible transparent material;
   an intermediate sheet behind the cover sheet, wherein the intermediate sheet comprises a flexible opaque material having a first color; and a substrate behind the intermediate sheet, wherein the substrate comprises a waxy material having a second color different from the first color.

9. The device of claim 4, further comprising:
a display erase mechanism comprising an erasing magnet attached to the moveable slider, wherein passage of the erasing magnet proximate to the unpowered display erases at least a portion of the visible mark on the unpowered display; and
a sensor to detect activation of the display erase mechanism.

10. The device of claim 4, further comprising:
the processor to execute the computer-executable instructions to:
determine placement of the stylus to the stylus retention mechanism using the stylus sensor; and
responsive to completion of the sending of the touch data, transition one or more of the memory, the processor, the touch sensor, or the communication interface from the second mode to the first mode.

11. The device of claim 4, wherein the touch data comprises one or more of a serialized listing of points detected by the touch sensor, one or more vector values, or an image.

12. A device comprising:
a stylus sensor to generate stylus data indicative of whether a stylus is stowed or removed;
an unpowered display configured to produce without electrical power a visible mark responsive to user input;
an electrically powered touch sensor to generate touch data corresponding to the user input;
an electrically powered communication interface;
a memory storing computer-executable instructions; and
a processor to execute the computer-executable instructions to:
determine first stylus data acquired at a first time is indicative of removal of the stylus; and
transition the touch sensor from a first mode to a second mode, wherein the first mode uses less electrical power than the second mode;
generate the touch data using the touch sensor;
determine second stylus data acquired at a second time is indicative of stowage of the stylus;
transition the communication interface from the first mode to the second mode;
based at least in part on the stowage of the stylus, send the touch data using the communication interface; and
provide an output using an output device that confirms that the touch data has been received.

13. The device of claim 12, wherein the touch sensor comprises:
an insulator;
an array of electrical conductors on the insulator; and
electronics to measure electrical capacitance at different points on the array.

14. The device of claim 12, wherein the touch sensor comprises:
an array of force sensitive resistors; and
electronics to measure electrical resistance at different points on the array.

15. The device of claim 12, wherein the touch data comprises one or more of a serialized listing of points detected by the touch sensor, one or more vector values, or an image.

16. The device of claim 12, the unpowered display comprising:
a non-opaque front panel;
a back panel;
a liquid including grains of a magnetic material, wherein the liquid is contained between the front panel and the back panel;
a slider mechanically coupled to an erasing magnet, wherein movement of the slider from a first position to a second position erases visual indicia presented on the front panel by the grains; and
wherein the touch sensor is arranged in front of the front panel of the unpowered display.

17. The device of claim 16, further comprising:
a switch positioned proximate to the first position to detect movement of the slider from the first position; and
a processor to execute the computer executable instructions to:
receive a signal from the switch; and
send the touch data responsive to the signal.

18. The device of claim 12, wherein the unpowered display comprises:
a cover sheet comprising a flexible transparent material;
an intermediate sheet behind the cover sheet, wherein the intermediate sheet comprises a flexible opaque material having a first color; and
a substrate behind the intermediate sheet, wherein the substrate comprises a waxy material having a second color different from the first color.

19. The device of claim 12, wherein the stylus sensor comprises a switch.

20. The device of claim 12, further comprising:
a display erase mechanism to remove at least a portion of the visible mark on the unpowered display;
a sensor to generate a signal indicative of use of the display erase mechanism; and
wherein the sending of the touch data is further responsive to the signal.

* * * * *